(12) United States Patent
Kowalski et al.

(10) Patent No.: US 6,774,517 B2
(45) Date of Patent: Aug. 10, 2004

(54) INJECTION MOLDED THREADED ROTOR AND MANUFACTURE METHOD

(75) Inventors: Keith Kowalski, Bethlehem, CT (US); Nino Maini, Trumbull, CT (US)

(73) Assignee: Tritex Corporation, Waterbury, CT (US)

( * ) Notice: Subject to any disclaimer, the term of this patent is extended or adjusted under 35 U.S.C. 154(b) by 0 days.

(21) Appl. No.: 10/182,012

(22) PCT Filed: Jan. 10, 2001

(86) PCT No.: PCT/US01/00749
§ 371 (c)(1),
(2), (4) Date: Jul. 24, 2002

(87) PCT Pub. No.: WO01/57989
PCT Pub. Date: Aug. 9, 2001

(65) Prior Publication Data
US 2003/0001443 A1 Jan. 2, 2003

Related U.S. Application Data
(60) Provisional application No. 60/179,448, filed on Feb. 1, 2000.

(51) Int. Cl.[7] .................................................. H02K 7/06
(52) U.S. Cl. .......................................... 310/80; 29/596
(58) Field of Search .............................. 310/12, 13, 14, 310/20, 80; 318/135; 29/598

(56) References Cited

U.S. PATENT DOCUMENTS

| | | | | |
|---|---|---|---|---|
| 4,079,475 A | * | 3/1978 | Thompson | 470/26 |
| 4,412,146 A | * | 10/1983 | Futterer et al. | 310/266 |
| 4,501,981 A | * | 2/1985 | Hansen | 310/49 R |
| 4,607,180 A | * | 8/1986 | Stoody | 310/80 |
| 4,822,270 A | * | 4/1989 | Bonissone et al. | 425/289 |
| 4,990,805 A | * | 2/1991 | Zieve | 310/27 |
| 5,254,892 A | * | 10/1993 | Bosman et al. | 310/49 R |
| 5,551,143 A | * | 9/1996 | Saval et al. | 29/598 |
| 5,693,347 A | * | 12/1997 | Hegler | 425/233 |
| 5,796,187 A | * | 8/1998 | Nagai et al. | 310/20 |
| 5,806,169 A | * | 9/1998 | Trago et al. | 29/596 |
| 5,811,901 A | * | 9/1998 | Nagai et al. | 310/80 |

* cited by examiner

*Primary Examiner*—Thanh Lam
*Assistant Examiner*—Judson H. Jones
(74) *Attorney, Agent, or Firm*—John H. Crozier

(57) ABSTRACT

In a preferred embodiment, a threaded rotor for a linear actuator, including: a generally cylindrical, metallic shell/insert (20); and a generally cylindrical threaded thermoplastic member (72) disposed in a wall of the generally cylindrical shell/insert, the threaded thermoplastic member having threads formed on an inner surface thereof and engagable with complementary threads formed on an outer surface of a shaft to be inserted in the generally cylindrical shell/insert.

6 Claims, 2 Drawing Sheets

INJECTION MOLDED THREADED ROTOR AND MANUFACTURE METHOD

CROSS-REFERENCE TO RELATED APPLICATION

The present application is a 371 of PCT Application No. PCT/01/00749, filed Jan. 10, 2001. Benefit is claimed of the filing date of United States Provisional Application No. 60/179,448, filed Feb. 01, 2000, and titled INJECTION MOLDED THREADED ROTOR FOR LINEAR ACTUATOR.

TECHNICAL FIELD

The present invention relates to rotors generally and, more particularly, but not by way of limitation to a novel injection molded threaded rotor for linear actuator.

BACKGROUND ART

One type of linear actuator is constructed by providing a threaded rotor inside an electric motor A complementarily threaded leadscrew is inserted through the rotor and rotor rotation causes the leadscrew to selectively advance linearly in one direction or the other depending on the direction of rotation of the rotor. One family of electric motors used in such applications is the step motor or more specifically, the hybrid step motor.

The traditional method of manufacturing a threaded rotor is to machine the threaded rotor portion of the motor from a bearing type material, such as bronze. This is a very labor intensive and costly operation for a number of reasons, among which are:

(1) Raw material is generally costly and there is a substantial amount of waste.
(2) Often, the thread form used is an acme thread and proper machining of the threads requires several operations.
(3) Materials that are good bearing materials do not necessarily machine easily, a good example being bronze.

In addition the process of machining these components produces parts that do not perform efficiently due to the generally poor surface finish of cut threads.

In other applications, it is common to use a thermoplastic material for the rotor, the thermoplastic material incorporating solid lubricants such as PTFE or silicone for increased efficiency Often, these parts use threads that are formed by injection molding This creates a more efficient thread form, due to the better surface finish Unfortunately the extension(s) of the threaded portion that create one or more bearing surfaces are not stable when formed of thermoplastic.

Consequently, it would be desirable to have a compound rotor that had the favorable characteristics of a thermoplastic threaded rotor, such as low coefficient of friction of the thermoplastic, with the stability of metal in the critical bearing journal area(s).

Accordingly, it is a principal object of the present invention to provide a compound rotor for a linear actuator that has an injection molded thermoplastic threaded portion, but with one or more bearing journal areas formed of metal.

It is a further object of the invention to provide such a compound rotor that can be easily and economically manufactured It is another object of the invention to provide such a compound rotor that can be produced in part, in an unscrewing mold.

Other objects of the present invention, as well as particular features, elements, and advantages thereof, will be elucidated in, or be apparent from, the following description and the accompanying drawing figures.

DISCLOSURE OF INVENTION

The present invention achieves the above objects, among others, by providing, in a preferred embodiment, a threaded rotor for a linear actuator, comprising a generally cylindrical, metallic shell/insert; and a generally cylindrical threaded thermoplastic member disposed in a wall of said generally cylindrical shell/insert, said threaded thermoplastic member having threads formed on an inner surface thereof and engagable with complementary threads formed on an outer surface of a shaft to be inserted in said generally cylindrical shell/insert.

BRIEF DESCRIPTION OF DRAWINGS

Understanding of the present invention and the various aspects thereof will be facilitated by reference to the accompanying drawing figures, provided for purposes of illustration only and not intended to define the scope of the invention, on which.

BEST MODE FOR CARRYING OUT THE INVENTION

Figure 1:
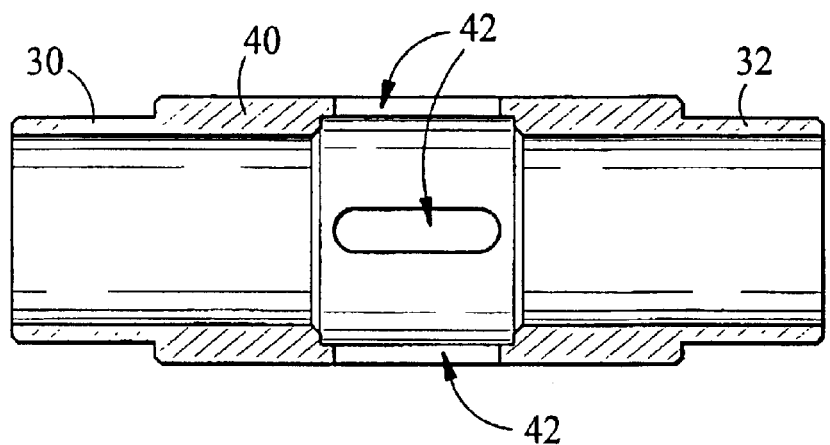
FIG. 1 is side elevational, cross-sectional view of a shell/insert according to the present invention

Reference should now be made to the drawing figures on which similar or identical elements are given consistent identifying numerals throughout the various figures thereof, and on which parenthetical references to figure numbers direct the reader to the view(s) on which the element(s) being described is (are) best seen, although the element(s) may be seen on other figures also.

Figure 2:
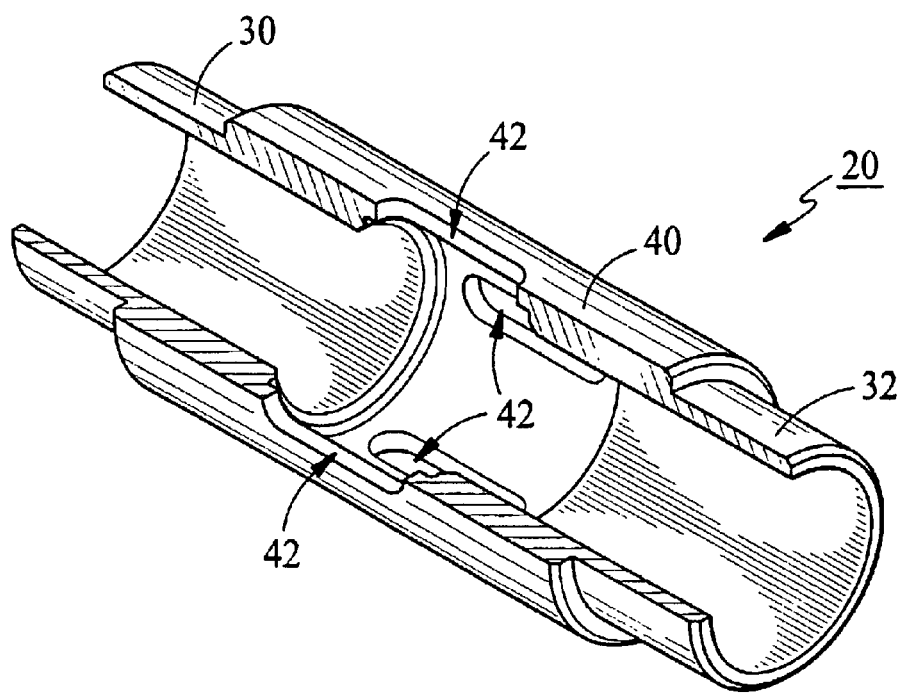
FIG. 2 is an isometric, cross-sectional view of the shell/insert of FIG. 1

FIGS. 1 and 2 illustrate a generally cylindrical shell/insert, constructed according to the present invention, and generally indicated by the reference numeral 20. Shell/insert 20 includes first and second bearing areas 30 and 32 and it will be understood that the first and second bearing areas will be journaled in bearings in the motor of which shell/insert becomes a part. It will also be understood that only one of bearing areas 30 and 32 may be provided and, thus, the present invention may be used in a motor having only one bearing structure. Shell/insert also includes a central portion 40, intermediate bearing areas 30 and 32, and having therein four, axially extending, equally radially spaced slots 42 (only three shown on FIG. 1 and two shown on FIG. 2) defined through the wall thereof Slots 42 provide retention and location features for an injection molded threaded portion, as will be seen with reference to FIGS. 3 and 4. A fewer or greater number of slots may be provided within the contemplation of the present invention.

Shell/insert is machined from an easily machinable material such as brass using conventional machining techniques.

Figure 3:
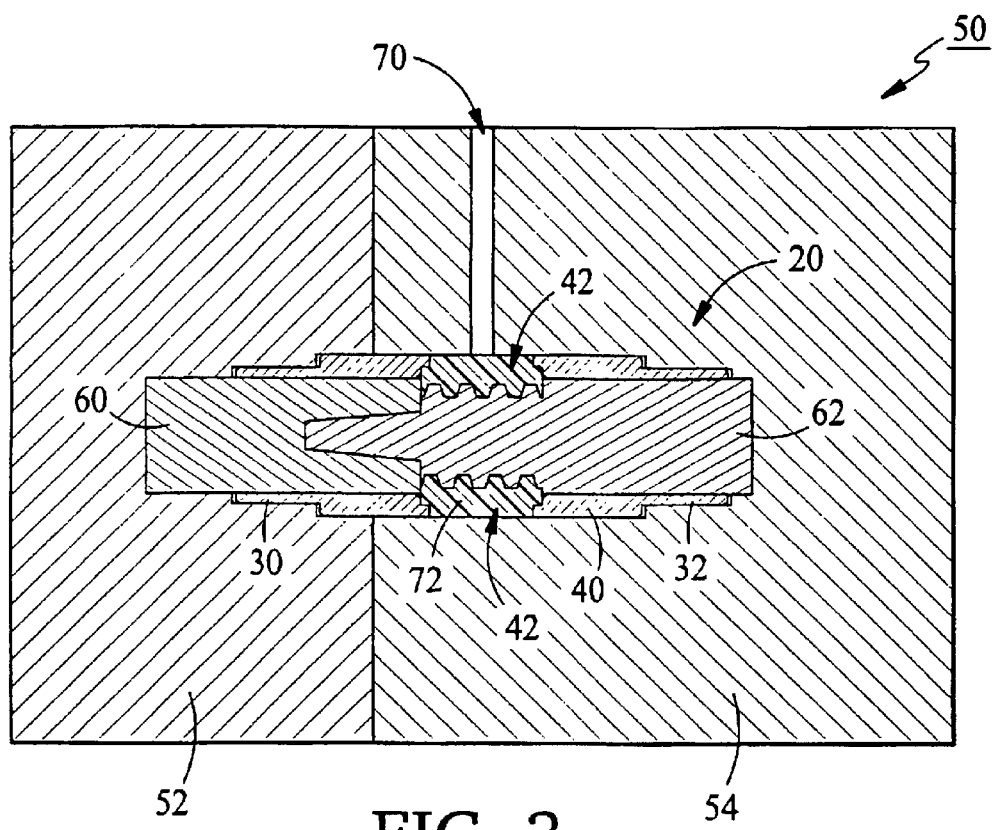
FIG. 3 is a side elevational view of a mold in which the rotor of the present invention has been completed

Referring now to FIG. 3, there is illustrated a mold, generally indicated by the reference numeral 50 and having first and second sections 52 and 54. Shell/insert 20 is disposed in mold 50. A locking core pin 60 has been inserted into one end of shell/insert 20 and a threaded locking core pin 62 having a portion of its external surface threaded has been inserted into the other end of the shell/insert. A runner/gate 70 in communication with slots 40 (FIG. 2) has been used to inject a thermoplastic around and into shell/insert 20 to form a threaded thermoplastic member 72 in the shell/insert, the thread of threaded thermoplastic member formed on the inner surface of threaded thermoplastic member being complementary to the thread formed on the outer surface of threaded locking core pin 62.

Figure 4:
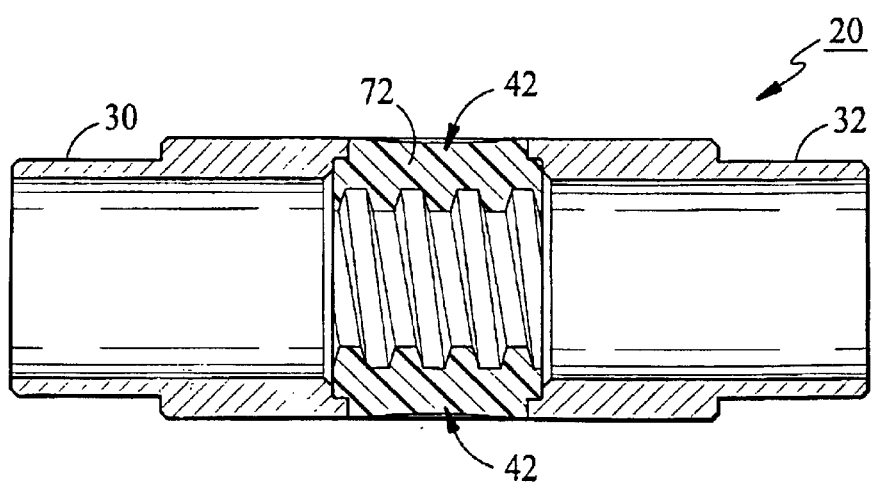
FIG. 4 is a side elevational view of a completed rotor of the present invention.

FIG. 4 illustrates the finished rotor. As is clearly indicated on FIG. 4, slots 40 serve as retainers to prevent rotation between thermoplastic member 72 and shell/insert 20.

In the manufacturing procedure, shell/insert 20 is machined to produce that part (FIGS. 1 and 2). Then, threaded locking core pin 62 and locking core pin 60 are inserted into shell/insert 20 (FIG. 3). Next, shell/insert with core pins 62 and 60 disposed therein is inserted into second section 54 of mold 50 and the second section and first section 52 are closed. Then, thermoplastic material is injected into mold 50 through runner/gate 70 to form threaded thermoplastic member 72 Next, mold 50 is opened, shell/insert 20 removed, locking core pin 60 removed, and threaded locking core pin 62 manually or automatically unscrewed from the shell/insert.

Locking core pin 60 is provided to prevent thermoplastic material from running out around the end of threaded locking core pin 62. Locking core pin 60 and threaded locking core pin 62 are interfitting to ensure proper alignment thereof The interfitting arrangement shown is a truncated, tapered pin formed on the proximal end of threaded locking core pin 62 inserted into a complementarily shaped channel formed in the proximal end of locking core pin 60, although other suitable arrangements may be provided as well.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A threaded rotor for a linear actuator, comprising:
   (a) a generally cylindrical, metallic shell/insert having two bearing areas on an external surface thereof; and
   (b) a generally cylindrical threaded thermoplastic member fixedly disposed in a wall of said generally cylindrical, metallic shell/insert, said threaded thermoplastic member having threads formed on an inner surface thereof and engagable with complementary threads formed on an outer surface of a shaft to be inserted in said generally cylindrical, metallic shell/insert.

2. A threaded rotor for a linear actuator, as defined in claim 1, further comprising: at least one slot formed in said wall of said generally cylindrical, metallic shell/insert into which a portion of said threaded thermoplastic member extends outwardly to prevent relative axial and radial movement of said threaded thermoplastic member in said generally cylindrical, metallic shell/insert.

3. A method of manufacture of a threaded rotor for a linear actuator, comprising:
   (a) machining a generally cylindrical shell/insert having two bearing areas;
   (b) placing said generally cylindrical shell/insert in a mold; and
   (c) injecting a thermoplastic material into said mold such as to form a threaded thermoplastic member disposed in a wall of said shell/insert, said threaded thermoplastic member having threads formed on an inner surface thereof and engagable with complementary threads formed on an outer surface of a shaft to be inserted in said generally cylindrical shell/insert.

4. A method of manufacture of a threaded rotor for a linear actuator, as defined in claim 3, wherein: said step of injecting includes injecting said thermoplastic material into at least one slot formed in said generally cylindrical shell/insert to permit some of said thermoplastic material to extend outwardly therein to prevent rotation of said threaded thermoplastic member in said shell/insert.

5. A method of manufacture of a threaded rotor for a linear actuator, as defined in claim 4, further comprising the step of inserting into said generally cylindrical shell/insert, before insertion of said shell/insert into said mold, a locking core pin and a threaded locking core pin, a thread on said threaded locking core pin forming a thread on said threaded thermoplastic material when said thermoplastic material is injected into said mold.

6. A method of manufacture of a threaded rotor for a linear actuator, comprising:
   (a) machining a generally cylindrical shell/insert having two bearing areas;
   (b) placing said generally cylindrical shell/insert in a mold;
   (c) injecting a thermoplastic material into said mold such as to form a threaded thermoplastic member disposed in a wall of said shell/insert, said threaded thermoplastic member having threads formed on an inner surface thereof and engagable with complementary threads formed on an outer surface of a shaft to be inserted in said generally cylindrical shell/insert, and injecting said thermoplastic material into at least one slot formed in said generally cylindrical shell/insert to permit some of said thermoplastic material to extend outwardly therein to prevent rotation of said threaded thermoplastic member in said shell/insert; and
   (d) inserting into said generally cylindrical shell/insert, before insertion of said shell/insert into said mold, a locking core pin and a threaded locking core pin, a thread on said threaded locking core pin forming a thread on said threaded thermoplastic material when said thermoplastic material is injected into said mold.

* * * * *